United States Patent
Park

(10) Patent No.: US 9,419,689 B2
(45) Date of Patent: Aug. 16, 2016

(54) MOBILE TERMINAL AND CONTROLLING METHOD THEREOF

(71) Applicant: LG ELECTRONICS INC., Seoul (KR)

(72) Inventor: Yangdoo Park, Seoul (KR)

(73) Assignee: LG ELECTRONICS, Seoul (KR)

( * ) Notice: Subject to any disclaimer, the term of this patent is extended or adjusted under 35 U.S.C. 154(b) by 0 days.

(21) Appl. No.: 14/327,703

(22) Filed: Jul. 10, 2014

(65) Prior Publication Data
US 2015/0056975 A1    Feb. 26, 2015

(30) Foreign Application Priority Data

Aug. 23, 2013   (KR) .................. 10-2013-0100531

(51) Int. Cl.
*H04M 3/00*     (2006.01)
*H04B 5/02*     (2006.01)
*H04M 1/725*    (2006.01)

(52) U.S. Cl.
CPC .............. *H04B 5/02* (2013.01); *H04M 1/7253* (2013.01); *H04M 1/72561* (2013.01); *H04M 1/72583* (2013.01); *H04M 2250/22* (2013.01)

(58) Field of Classification Search
CPC ..................... H04M 1/72518; H04M 1/72522; H04W 8/245; G06F 17/30867; G06F 17/30321
USPC ..................... 455/550.1, 418, 556.1; 709/201; 707/639
See application file for complete search history.

(56) References Cited

U.S. PATENT DOCUMENTS

| | | | | |
|---|---|---|---|---|
| 7,533,125 | B2 * | 5/2009 | Satomi | G06F 21/62 |
| 2003/0135539 | A1 * | 7/2003 | Kondo | G06F 17/30867 709/201 |
| 2005/0069107 | A1 * | 3/2005 | Tanaka | H04N 7/147 379/93.17 |
| 2006/0064297 | A1 * | 3/2006 | Sugishita | G06F 9/505 703/24 |
| 2007/0100816 | A1 * | 5/2007 | Muroi | G06F 17/30011 |
| 2009/0141987 | A1 * | 6/2009 | McGarry | G06K 9/00986 382/218 |
| 2009/0144182 | A1 * | 6/2009 | Matsuda | G06Q 30/04 705/32 |
| 2012/0303847 | A1 * | 11/2012 | Brux | H04L 41/0806 710/104 |
| 2013/0103657 | A1 * | 4/2013 | Ikawa | G06F 17/30985 707/693 |
| 2014/0019651 | A1 * | 1/2014 | Ben-Harosh | G06F 9/4413 710/63 |

\* cited by examiner

*Primary Examiner* — Danh Le
(74) *Attorney, Agent, or Firm* — KED & Associates, LLP

(57) ABSTRACT

A mobile terminal and controlling method thereof are disclosed, by which data useful in an external device among data accumulated through the mobile terminal can be transmitted only. The present invention includes a display unit, a wireless communication unit configured to communicate with at least one external device, a memory configured to store a plurality of data accumulated via the mobile terminal, and a controller configured to search the stored data for at least one data useful in the external device, and the controller controls the wireless communication unit to transmit the searched data to the external device.

20 Claims, 20 Drawing Sheets

FIG. 6
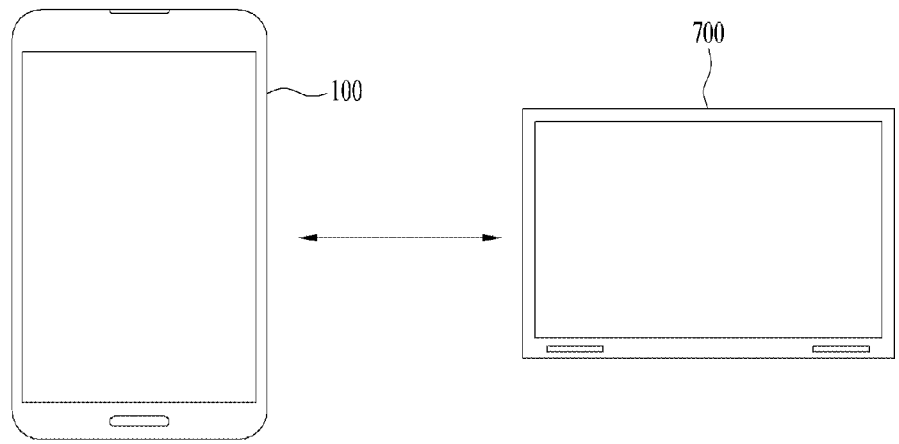
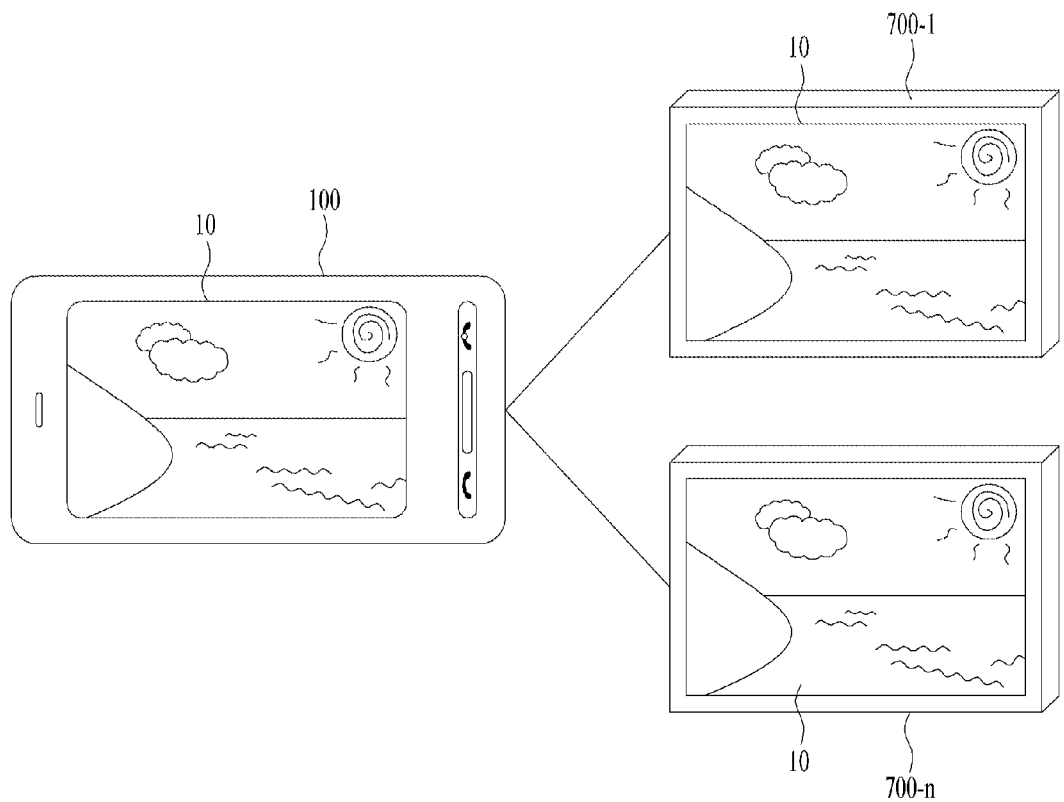

FIG. 16
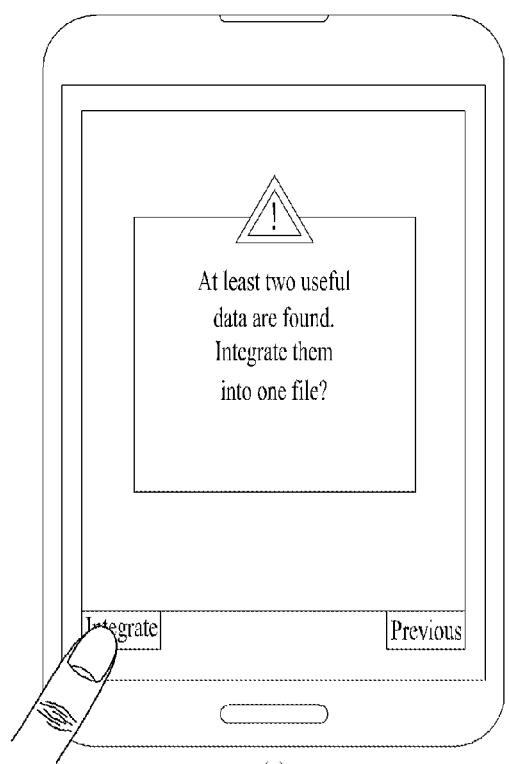
(a)
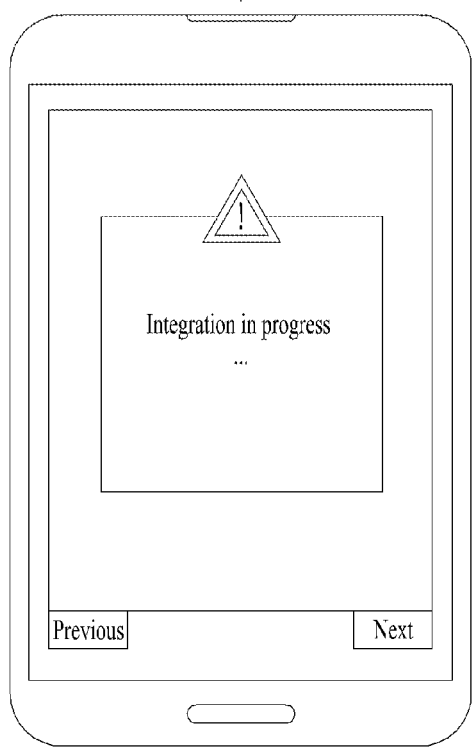
(b)

FIG. 17
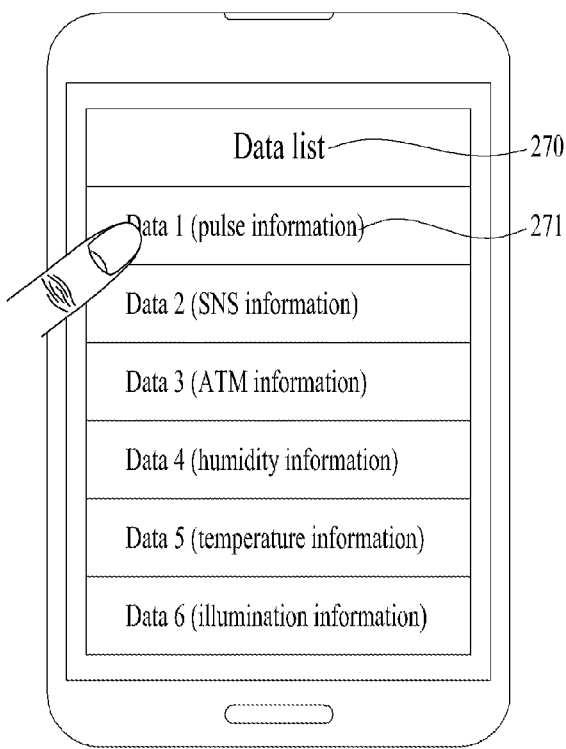
(a)
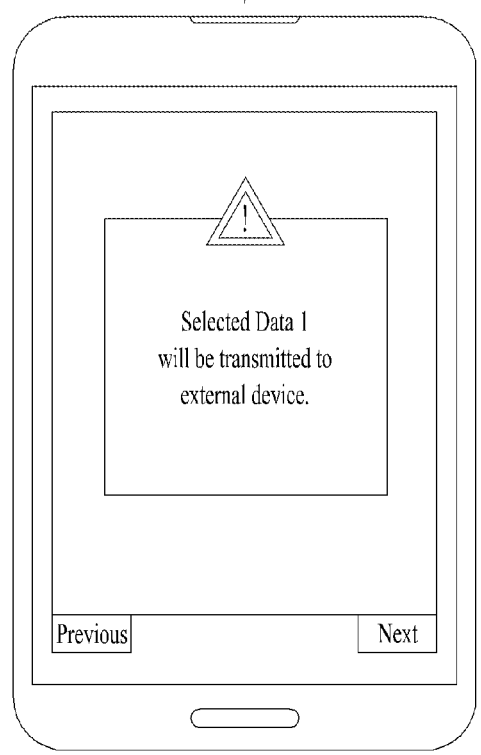
(b)

FIG. 18
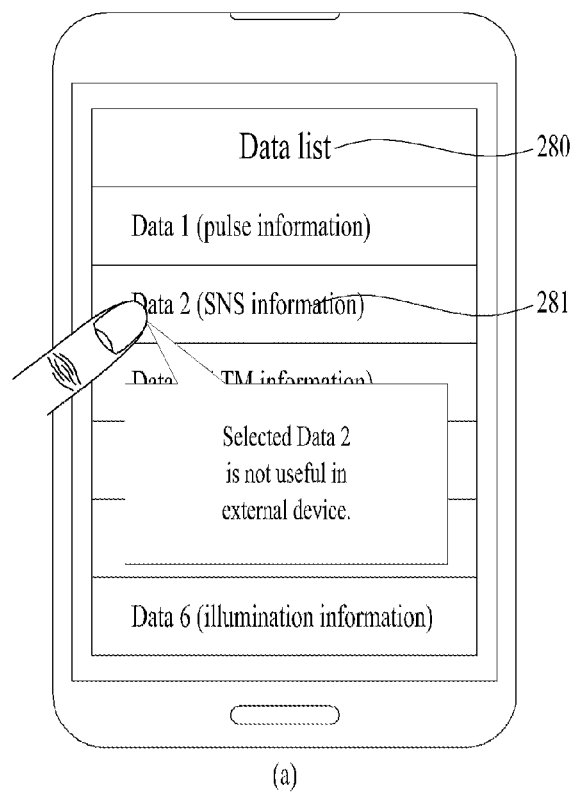
(a)
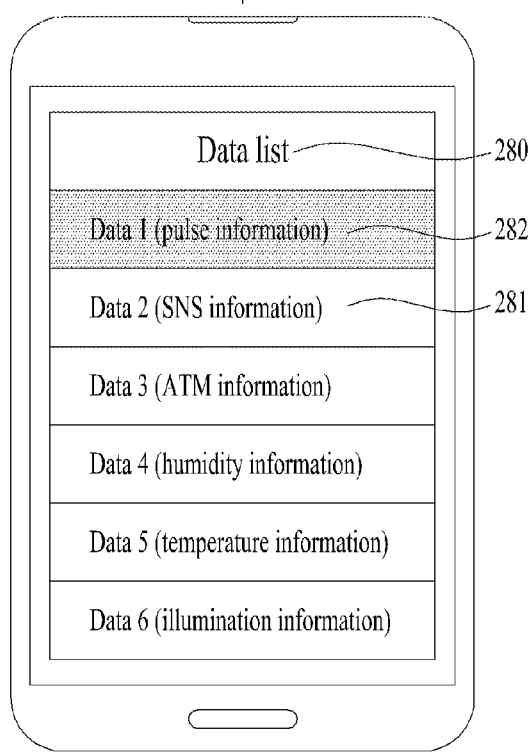
(b)

FIG. 19
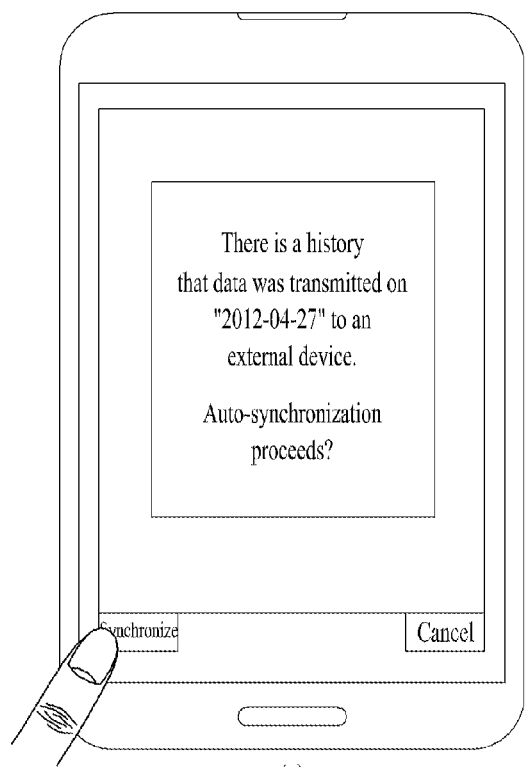
(a)
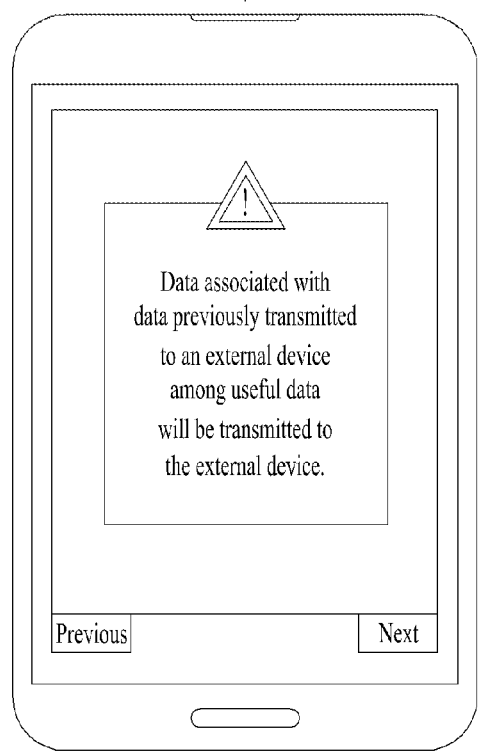
(b)

FIG. 20
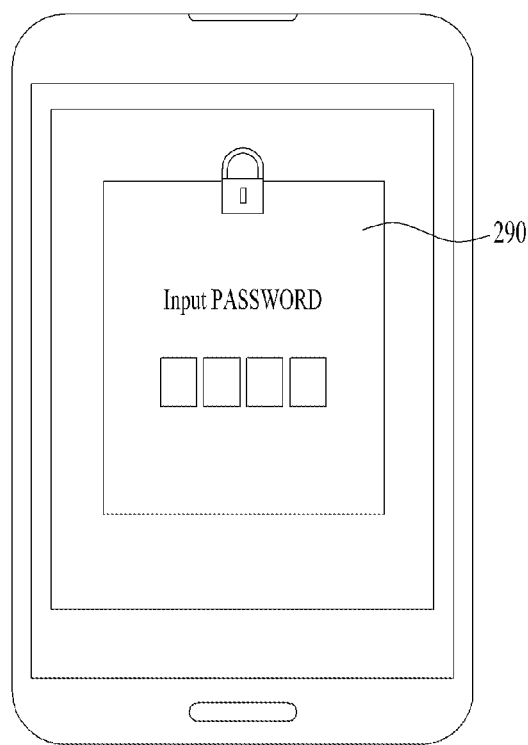
(a)
(b)

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2013-0100531, filed on Aug. 23, 2013, the contents of which are hereby incorporated by reference herein in their entirety.

BACKGROUND

1. Field

The present invention relates to a mobile terminal, and more particularly, to a mobile terminal and a method of controlling the mobile terminal.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Currently, as capabilities of a mobile terminal progress, various kinds of data can be accumulated through the mobile terminal and the accumulated data can be transmitted to external devices.

However, when various kinds of data accumulated in a mobile terminal are transmitted to an external device, the data selected by a user is transmitted to the external device only without considering specifications of the external device and the like. Thus, the user-selected data transmitted to the external device may not run in the external device or may become unuseful data.

The above references are incorporated by reference herein where appropriate for appropriate teachings of additional or alternative details, features and/or technical background.

SUMMARY

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which data useful for an external device is selected from data accumulated through the mobile terminal and then transmitted.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a display unit, a wireless communication unit configured to communicate with at least one external device, a memory configured to store a plurality of data accumulated via the mobile terminal, and a controller configured to search the stored data for at least one data useful in the external device, and the controller controls the wireless communication unit to transmit the searched data to the external device.

In another aspect of the present invention, a method of controlling a mobile terminal according to the present invention may include the steps of accumulating and storing a plurality of data via the mobile terminal, searching the stored data for at least one data useful in an external device, and transmitting the searched data to the external device.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 6 is a diagram to describe a system including a mobile terminal according to the present invention and at least one external device;

FIGS. 8 to 20 are diagrams to describe a process for transmitting data in a mobile terminal according to the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Moreover, an external device described in the present specification includes such a device configured to receive runnable or useful data from a mobile terminal as a mobile phone, a smart phone, a laptop computer, a digital broadcast terminal, a PDA (personal digital assistants), a PMP (portable multimedia player), a navigation device, a health diagnosis device, an exercise amount measurement device and the like.

Figure 1:
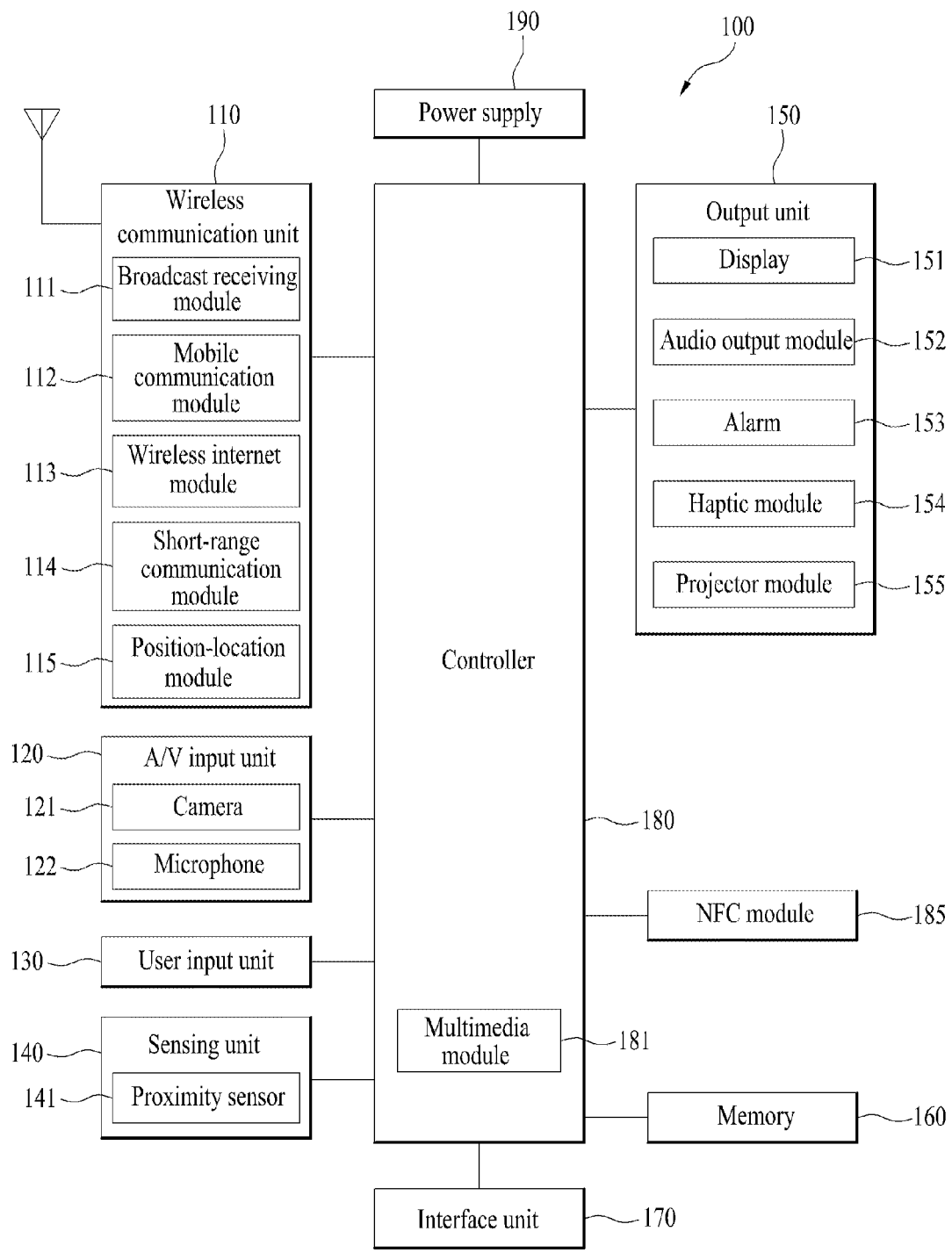
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

And, the wireless communication unit 110 transmits data useful or runnable in an external device 700 among a plurality of data accumulated through the mobile terminal to the external device 700 under the control of the controller 180.

Moreover, the wireless communication unit 110 transmits a signal for requesting device information of the external device to the external device 700 under the control of the controller 180 and is then able to receive the device information of the external device from the external device 700, under the control of the controller 180.

In this case, the device information of the external device 700 may include at least one of device specs of various components included in the external device 700, a list of applications installed on the external device 700 and a list of types of the data runnable or useful in the external device 700.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

Moreover, the mobile communication module 112 transmits a signal for requesting the device information of the external device 700 to the external device 700 and is then able to receive the device information of the external device 700 from the external device 700, under the control of the controller 180.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

And, the wireless internet module 113 transmits data useful or runnable in the external device 700 among the data accumulated through the mobile terminal 100 to the external device 700 under the control of the controller 180.

Moreover, the wireless internet module 113 transmits a signal for requesting the device information of the external device 700 to the external device 700 and is then able to receive the device information of the external device 700 from the external device 700, under the control of the controller 180.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

And, the short range communication module 114 transmits data useful or runnable in the external device 700 among the data accumulated through the mobile terminal 100 to the external device 700 under the control of the controller 180.

Moreover, the short range communication module 114 transmits a signal for requesting the device information of the external device 700 to the external device 700 and is then able to receive the device information of the external device 700 from the external device 700, under the control of the controller 180.

The position-information module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (NV) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

Figure 2:
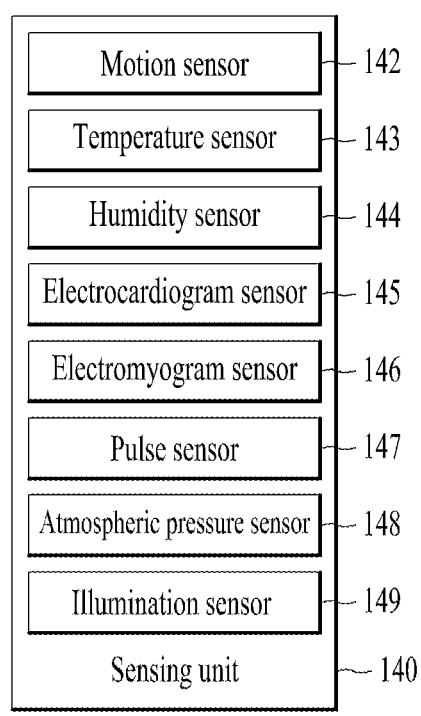
FIG. 2 is a block diagram of a sensing unit including sensors for accumulating data according to the present invention.

Moreover, referring to FIG. 2, the sensing unit 140 can include at least one of a motion sensor 142, a temperature sensor 143, a humidity sensor 144, an electrocardiogram sensor 145, an electromyogram sensor 146, a pulse sensor 147, an atmospheric pressure sensor 148 and an illumination sensor 149.

The motion sensor 142 senses a motion gesture in response to a motion of the mobile terminal 100 and then records data corresponding to the sensed motion gesture in the memory 160. The motion sensor 142 may include a gyro sensor configured to measure and record a motion of the mobile terminal 100 in the memory 160, an acceleration sensor configured to measure and record an acceleration of the mobile terminal 100 in the memory 160 and a geomagnetic sensor configured to measure and record a compass direction of the mobile terminal 100 in the memory 160.

The temperature sensor 143 measures a surrounding temperature of the mobile terminal 100 and then records data corresponding to a result of the measurement in the memory 160. And, the humidity sensor 144 measures a surrounding humidity of the mobile terminal 100 and then records data corresponding to a result of the measurement in the memory 160. In doing so, the controller 180 can recommend the temperature/humidity corresponding to an optimal living condition to a user based on the surrounding temperature/humidity measured through the temperature/humidity sensor 143/144.

The electrocardiogram sensor 145 measures an electrocardiogram of a user and then records data corresponding to a result of the measurement in the memory 160. The electrocardiogram sensor 145 may be provided within the mobile terminal 100 or connected to the mobile terminal 170 via the interface unit 170. The electrocardiogram sensor 145 is attached nearby a heart of a user, measures an electrocardiogram of the user, and is then able to record the measured electrocardiogram in the memory 160. Alternatively, the electrocardiogram sensor 145 is configured as an external measurement device, transmits data corresponding to an electrocardiogram of a user to the mobile terminal 100 through a wireless communication such as a short range communication, and is then able to record the corresponding data in the memory 160.

The electromyogram sensor 146 measures an electromyogram of a user and then records data corresponding to a result of the measurement in the memory 160. The electromyogram sensor 146 may be provided within the mobile terminal 100 or connected to the mobile terminal 170 via the interface unit 170. The electrocardiogram sensor 145 is attached to at least one body part of a user, measures an electromyogram of the user, and is then able to record the measured electromyogram in the memory 160. Alternatively, the electromyogram sensor 146 is configured as an external measurement device, transmits data corresponding to an electromyogram of a user to the mobile terminal 100 through a wireless communication such as a short range communication, and is then able to record the corresponding data in the memory 160.

The pulse sensor 147 measures a pulse of a user and then records data corresponding to a result of the measurement in the memory 160. The pulse sensor 147 may be provided within the mobile terminal 100 or connected to the mobile terminal 170 via the interface unit 170. The pulse sensor 147 is attached to a wrist of a user, measures a pulse of the user, and is then able to record the measured pulse in the memory 160. Alternatively, the pulse sensor 147 is configured as an external measurement device, transmits data corresponding to a pulse of a user to the mobile terminal 100 through a wireless communication such as a short range communication, and is then able to record the corresponding data in the memory 160.

The atmospheric pressure sensor 148 measures an atmospheric pressure around the mobile terminal 100 and then records data corresponding to the measured atmospheric pressure in the memory 160.

The illumination sensor 149 measures an illumination around the mobile terminal 100 and then records data corresponding to the measured illumination in the memory 160.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, data accumulated through the mobile terminal 100 is saved in the memory.

In particular, the data measured and accumulated through at least one of the motion sensor 142, the temperature sensor 143, the humidity sensor 144, the electrocardiogram sensor 145, the electromyogram sensor 146, the pulse sensor 147, the atmospheric pressure sensor 148 and the illumination sensor 149 is saved in the memory 160. If various kinds of applications installed on the mobile terminal 100 are activated, data accumulated through the activated applications are saved in the memory 160. If a specific web browser is activated, data accumulated through the activated web browser is saved in the memory 160. Data accumulated through various functions or menus provided to the mobile terminal 100 are saved in the memory 160. A location information, moving path and destination location of the mobile terminal 100, which are accumulated through the position location module 115, are saved in the memory 160. And, SNS related data accumulated though an SNS messenger installed on the mobile terminal 100 is saved in the memory 160.

In doing so, when the data accumulated each day through the mobile terminal 100 are saved in the memory 160, the controller 180 converts a type and size of the accumulated data to a numerical value and graph and is then able to the numeric and graphic data on a screen.

The controller 180 sorts the data accumulated through sensors by the sensors, converts types and sizes of the sorted data to numerical values and graphs, and is then able to display the numerical and graphic data on the screen.

The controller 180 sorts the data accumulated through applications by the applications, converts types and sizes of the sorted data to numerical values and graphs, and is then able to display the numerical and graphic data on the screen.

The controller 180 sorts the data accumulated through web browsers by the web browsers, converts types and sizes of the sorted data to numerical values and graphs, and is then able to display the numerical and graphic data on the screen.

And, the controller 180 sorts the data accumulated through SNS messengers by the messengers, converts types and sizes of the sorted data to numerical values and graphs, and is then able to display the numerical and graphic data on the screen.

Moreover, device information of at least one external device 700 which is to receive data transmitted by the mobile terminal 100 is saved in the memory 160. The device information of the external device 700 can include at least one of device specs of various components provided to the external device 700, a list of applications provided to the external device 700 and a list of types of data useful and runnable in the external device 700.

In particular, the controller 180 searches the data accumulated and saved in the memory 160 for the data runnable or useful in the external device 700 and is then able to control the found data to be transmitted to the external device 700.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The NFC (near field communication) module 185 provides a short range wireless access communication using magnetic induction between devices located close to each other.

Unlike a smart card configured to play a role as a tag for storing and transmitting specific information to a reader, the NFC can play a role as a reader and writer as well as the role as the tag if necessary. If NFC is provided to each of both terminals, it can be used for P2P (point to point) information exchange.

In particular, if the NFC module 185 is tagged with an NFC module 760 provided to the external device 700, the NFC module 185 transmits data, which is provided to the memory 160 and is also useful for the external device 700, to the NFC module 760 of the external device 700.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 3:
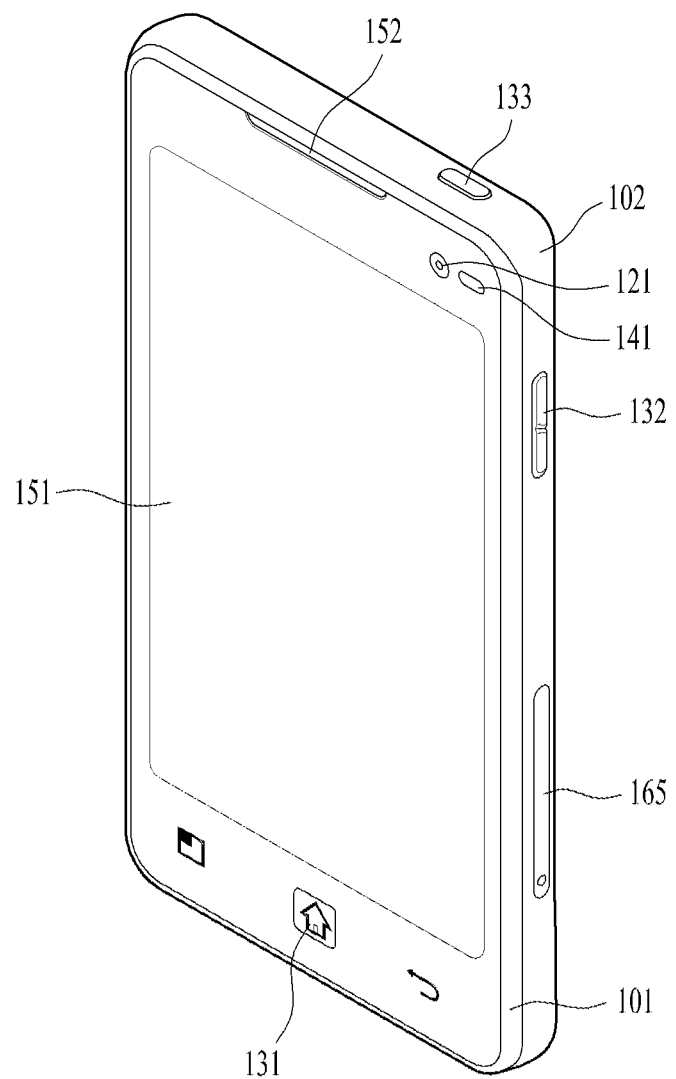
FIG. 3 is a front perspective diagram of a mobile terminal according to one embodiment of the present invention.

FIG. 3 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 3, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 3, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 4:
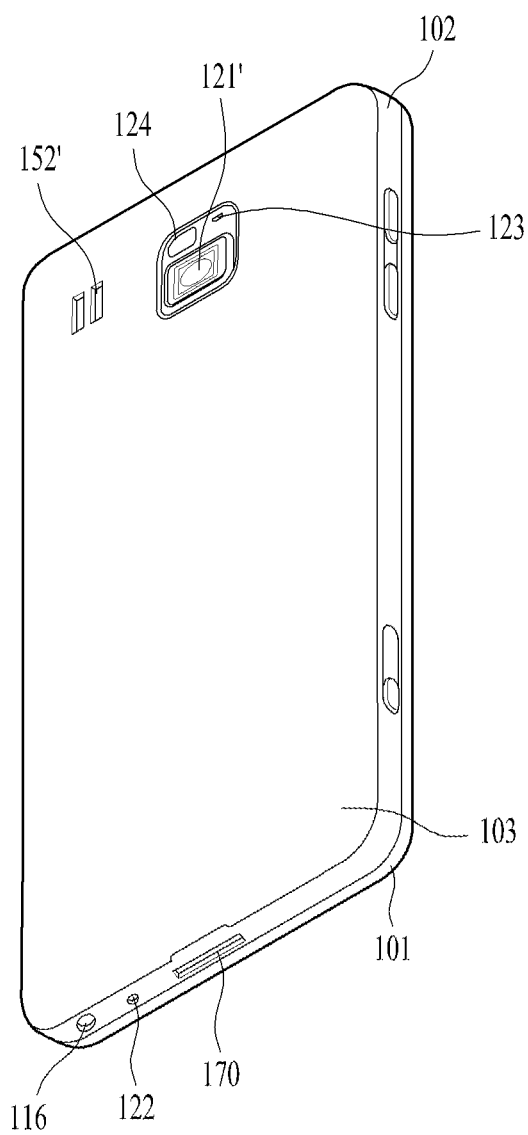
FIG. 4 is a rear perspective diagram of a mobile terminal according to one embodiment of the present invention.

FIG. 4 is a perspective diagram of a backside of the terminal shown in FIG. 3.

Referring to FIG. 4, a camera 121' can be additionally provided to a backside of the terminal body, and more particularly, to the rear case 102. The camera 121 has a photographing direction that is substantially opposite to that of the former camera 121 shown in FIG. 3 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 3 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Meanwhile, according to an embodiment of the present invention, a user's touch action means a touch gesture implemented in a manner of performing a contact touch or a proximity touch on the display unit 151 of the touchscreen type. And, a touch input means an input received in response to the touch gesture.

The touch gesture may be categorized into one of a tapping, a touch & drag, a flicking, a press, a multi-touch, a pinch-in, a pinch out and the like in accordance with an action.

In particular, the tapping includes an action of lightly pressing and depressing the display unit 151 once and means a touch gesture such as a lock of a mouse of a normal personal computer.

The touch & drag is an action of touching the display unit, then moving the touch to a specific point by maintaining the touch to the display unit 151, and then releasing the touch from the display unit 151. When an object is dragged, the corresponding object can be displayed in a manner of moving continuously in a drag direction.

The flicking means an action of touching the display unit 151 and then performing a stroke in a specific direction (e.g., top direction, bottom direction, right direction, left direction, diagonal direction, etc.) at a specific speed (or strength). If a touch input of flicking is received, the mobile terminal 100 processes a specific operation based on a flicking direction, a flicking speed and the like.

The press means an action of touching the display unit 151 and then continuing the touch for preset duration at least.

The multi-touch means an action of simultaneously touching a plurality of points on the display unit 151.

The pinch-in means an action of dragging a plurality of pointers currently multi-touching the display unit 151 in an approaching direction. In particular, the pinch-in means a drag performed in a manner of starting with at least one of a plurality of points multi-touched on the display unit 151 and then progressing in a direction having a plurality of the multi-touched points get closer to each other.

The pinch-out means an action of dragging a plurality of pointers currently multi-touching the display unit 151 in a moving-away direction. In particular, the pinch-out means a drag performed in a manner of starting with at least one of a plurality of points multi-touched on the display unit 151 and then progressing in a direction having a plurality of the multi-touched points move away from each other.

In the following description, a process for transmitting data in a mobile terminal according to the present invention is explained in detail with reference to FIGS. 5 to 20.

First of all, a configuration of an external device 700 configured to receive data from the mobile terminal 100 according to the present invention is described in detail with reference to FIG. 5 as follows.

Figure 5:
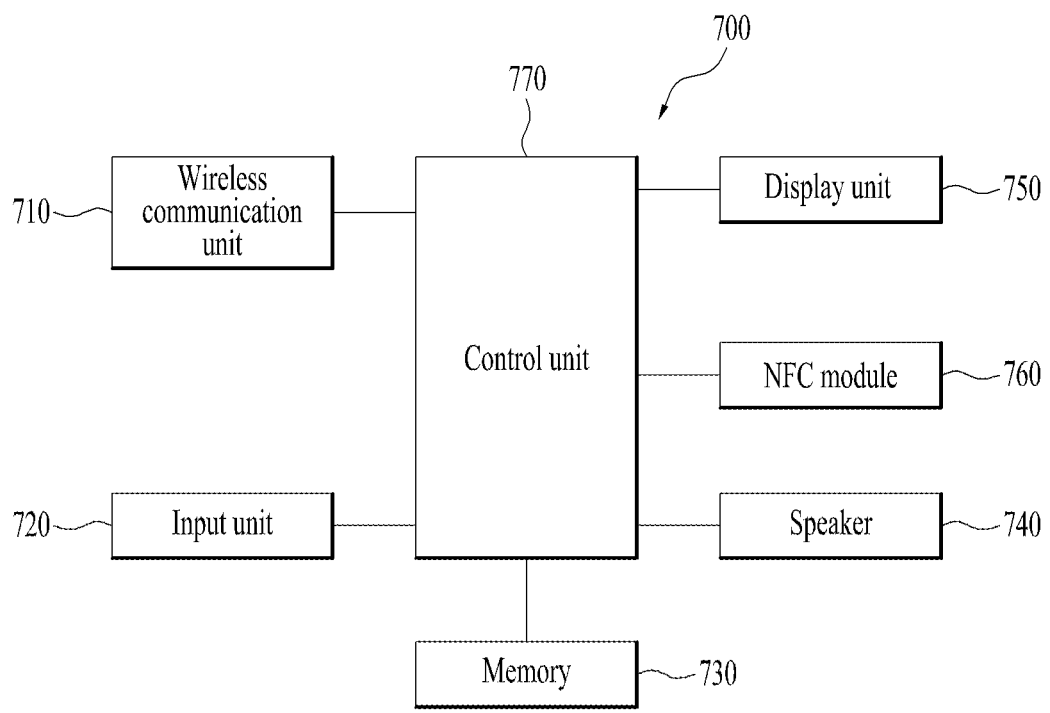
FIG. 5 is a block diagram of an external device in association with one embodiment of the present invention.

FIG. 5 is a block diagram of an external device in association with one embodiment of the present invention.

Referring to FIG. 5, an external device 700 according to the present invention includes a wireless communication unit 710, an input unit 720, a memory 730, a speaker 740, a display unit 750, an NFC module 760 and a control unit 770.

Optionally, in addition to the above-mentioned components, the external device 700 can be provided with the components of the mobile terminal 100 mentioned in the foregoing description. In particular, the external device 700 is a mobile terminal and may include the same components of the mobile terminal 100 shown in FIG. 1.

The wireless communication unit 710 is communication-connected to the mobile terminal 100 according to the present invention and can receive data, which is to be displayed on outputted to the external device 700, from the mobile terminal 100. The data received from the mobile terminal 700 may include at least one of an image data of a content activated in the mobile terminal 100, a file of the content and a video/audio data of the content played or activated in the mobile terminal 100.

The wireless communication unit 710 receives data runnable or useful in the external device 700 from the mobile terminal 100.

If a request signal for requesting device information of the external device 700 is received from the mobile terminal 100, the wireless communication unit 710 transmits the device information of the external device 700, which is saved in the memory 730, to the mobile terminal 100.

Like the former wireless communication unit 110 of the mobile terminal 100 shown in FIG. 1, the above-configured wireless communication unit 710 can include a mobile communication module, a wireless internet module and a short range communication module to enable communications between the mobile terminal 100 and the external device 700.

For instance, the mobile terminal 100 and the external device 700 can be communication-connected to each other by one of communication systems including a mobile communication, a wireless internet communication, Bluetooth, DLNA and the like.

The input unit 720 generates a key signal for controlling an operation of the external device 700. Optionally, the input unit 720 may include a keypad dome switch, a touchpad (pressure-static/electrostatic), a jog wheel, a jog switch, a mouse and the like.

The memory 730 can store programs for operations of the external device 700, various kinds of data including video files, audio files, image files and the like, and the device information of the external device 700.

The speaker 740 outputs the audio file saved in the memory 730 and audio data received from the mobile terminal 100 through the wireless communication unit 710.

The display unit 750 displays information processed by the external device 700. The above-configured display unit 750 can include at least one of a liquid crystal display (LCD), a thin film transistor-liquid crystal display (TFT-LCD), an organic light emitting diode (OLED), a flexible display, a 3D display and the like. Moreover, the display 750 can be configured as a touchscreen by being combined with touch sensors.

The display unit 750 displays the data (still and moving images included) received from the mobile terminal 100 on a screen.

If the NFC module 760 is tagged with the NFC module 185 of the mobile terminal 100, the NFC module 760 can receive data from the NFC module 185 of the mobile terminal 100.

The control unit 770 controls overall operations of the external device 700. If the data runnable or useful in the external device 700 is received from the mobile terminal 100 through the wireless communication unit 710 or the NFC module 760, the control unit 770 saves the received data in the memory 730 or runs/utilizes the received data.

So far, the configuration of the external device 700 according to the present invention is described.

In the following description, a communication connection and data transceiving process between the above-configured mobile terminal 100 and the above-configured external device 700 is explained with reference to FIG. 6.

FIG. 6 is a diagram to describe a system including a mobile terminal according to the present invention and at least one external device.

FIG. 6 (a) shows a system including a mobile terminal 100 and at least one external device 700.

Referring to FIG. 6 (a), the mobile terminal 100 connects a communication with the external device 700 and is then able to transmit data runnable or useful in the external device 700 among the data accumulated in the memory 160 to the external device 700.

For instance, the mobile terminal 100 and the external device 700 can connect communication with each other using one of the wireless communications including the mobile communication, the wireless internet communication and the short range communication. In doing so, if the short range communication is used, the mobile terminal 100 and the external device 700 can connect the communication with each other using the short range communication corresponding to one of Bluetooth and DLNA.

Referring to FIG. 6 (b), the mobile terminal 100 connects communications with one or at least two of a plurality of external devices 700-1 to 700-n and is then able to transmit the data 10 runnable or useful in the one or at least two external devices 700-1 to 700-n among the data accumulated in the memory 160 to the one or at least two external devices 700-1 to 700-n.

In the following description, with reference to FIGS. 7 to 20, a process for only selecting data runnable or useful in the external device 700 from the data accumulated through the mobile terminal 100 and then transmitting the selected data to the external device 700 according to the present invention is explained in detail.

Figure 7:
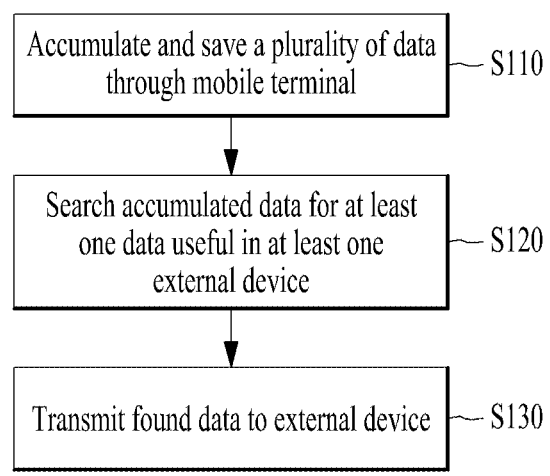
FIG. 7 is a flowchart of a process for transmitting data in a mobile terminal according to the present invention.

FIG. 7 is a flowchart of a process for transmitting data in a mobile terminal according to the present invention.

FIGS. 8 to 20 are diagrams to describe a process for transmitting data in a mobile terminal according to the present invention.

Referring to FIGS. 7 to 20, the controller 180 of the mobile terminal 100 accumulates data through the mobile terminal 100 every day or for a preset period and then saves the accumulated data in the memory 160 [S110].

For instance, the controller 180 can save the data, which is measured and accumulated though at least one of the motion sensor 142, the temperature sensor 143, the humidity sensor 144, the electrocardiogram sensor 145, the electromyogram sensor 146, the pulse sensor 147, the atmospheric pressure sensor 148 and the illumination sensor 149, in the memory 160. In this case, the controller 180 converts a type and size of the accumulated data to a numerical value and graph and is then able to the numeric and graphic data on a screen.

The controller 180 sorts the data accumulated through the sensors by the sensors 142 to 149, converts types and sizes of the sorted data to numerical values and graphs, and is then able to display the numerical and graphic data on the screen.

For another instance, if various applications installed on the mobile terminal 100 are activated, the controller 180 saves the data accumulated through the activated application in the memory 160. In doing so, the controller 180 sorts the data accumulated through the applications by the applications, converts types and sizes of the sorted data to numerical values and graphs, and is then able to display the numerical and graphic data on the screen.

For another instance, if the web browsers installed on the mobile terminal 100 are activated, the controller 180 saves the data accumulated through the web browsers in the memory 160. In doing so, the controller 180 sorts the data accumulated through the web browsers by the web browsers, converts types and sizes of the sorted data to numerical values and graphs, and is then able to display the numerical and graphic data on the screen.

For another instance, the controller 180 saves data accumulated through various functions provided to the mobile terminal 100 in the memory 160. In doing so, the controller 180 sorts the data accumulated through the functions by the functions, converts types and sizes of the sorted data to numerical values and graphs, and is then able to display the numerical and graphic data on the screen.

For another instance, the controller 180 saves data accumulated through various menus provided to the mobile terminal 100 in the memory 160. In doing so, the controller 180 sorts the data accumulated through the menus by the menus, converts types and sizes of the sorted data to numerical values and graphs, and is then able to display the numerical and graphic data on the screen.

For another instance, the controller 180 saves data including a location information, moving path and destination location of the mobile terminal 100, which are accumulated through the position location module 115, in the memory 160.

For further instance, the controller 180 saves SNS related data accumulated though the SNS messenger installed on the mobile terminal 100 in the memory 160. In doing so, the controller 180 sorts the SNS related data accumulated through SNS messengers by the messengers, converts types and sizes of the sorted data to numerical values and graphs, and is then able to display the numerical and graphic data on the screen.

Figure 8:
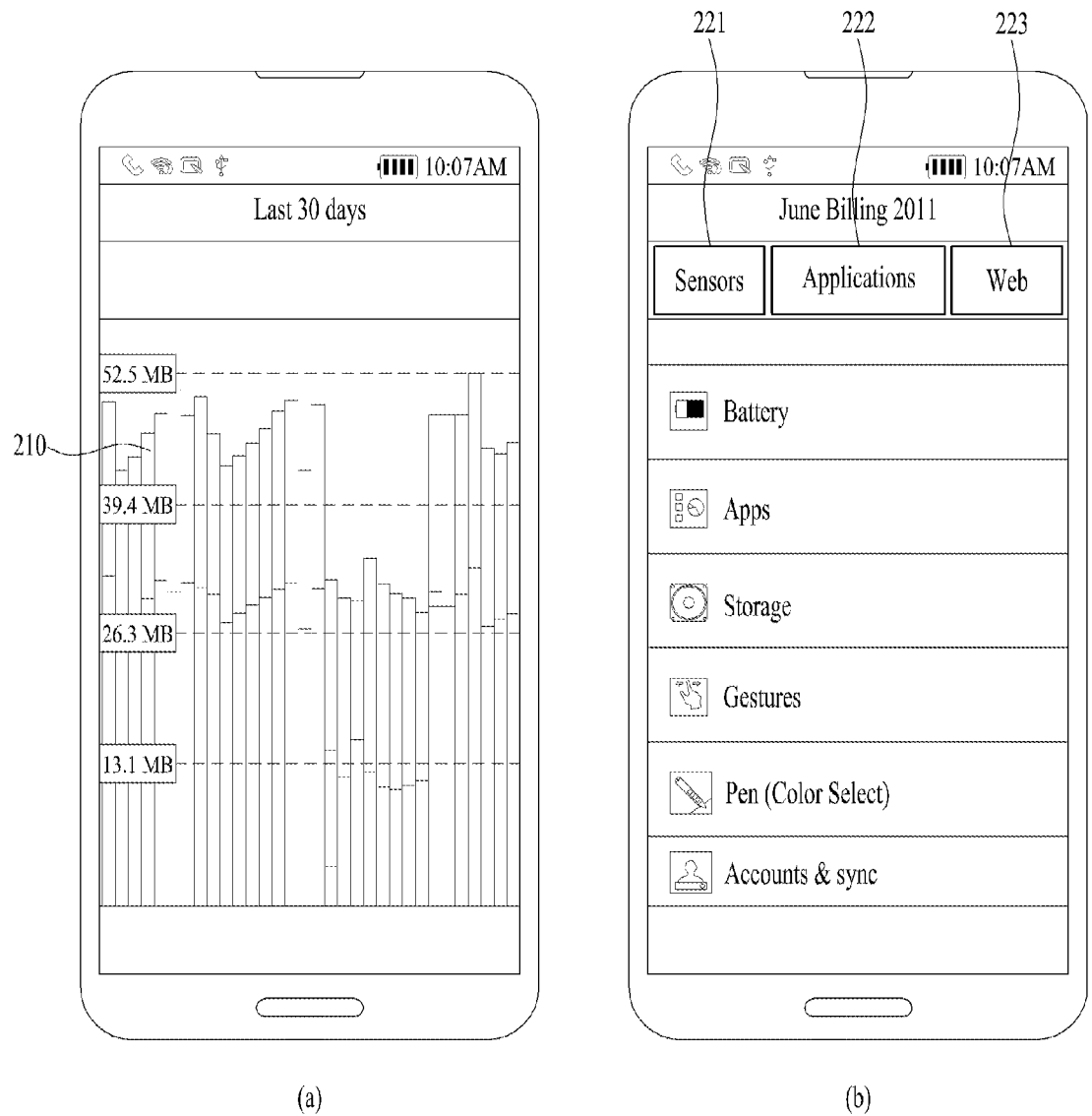

For instance, referring to FIG. 8, when the controller 180 of the mobile terminal 100 accumulates data through the mobile terminal 100 every day or for a preset period and then saves the accumulated data in the memory 160, the controller 180 converts a type and size of the accumulated data to a numerical value and graph and is then able to the numeric and graphic data on a screen.

In particular, FIG. 8 (a) shows a graph 210 of the numerical values of the types and sizes of the data accumulated through the mobile terminal 100 for 30 days. FIG. 8 (b) shows a 1st tab 221 for displaying the data accumulated by the sensors, a 2nd tab 222 for displaying the data accumulated by the applications, and a 3rd tab 223 for displaying the data accumulated by the web browsers.

In particular, if a user selects the 1st tab 221, the controller 180 searches the data accumulated in the memory 160 for the data accumulated by the sensors and then displays a list of the found data. And, if a user selects the 2nd tab 222, the controller 180 searches the data accumulated in the memory 160 for the data accumulated by the applications and then displays a list of the found data. Moreover, if a user selects the 3rd tab 223, the controller 180 searches the data accumulated in the memory 160 for the data accumulated by the web browsers and then displays a list of the found data.

Referring now to FIG. 7, the controller 180 sets at least one external device 700 for data repletion, searches the data set in the memory 160 for at least one data runnable or useful in the external device 700 [S120], and then transmits the found data to the external device 700 through the wireless communication unit 110 or the NFC module 185 [S130].

In doing so, the controller 180 searches the data accumulated in the memory 160 for the at least one data runnable or useful in the external device 700 based on the device information 700, which is previously saved in the memory 160, of the external device 700.

For instance, based on the device information of the external device 700, if the external device 700 is the health diagnosis device, the controller 180 searches the data accumulated in the memory 160 for the data including the pulse information runnable or useful in the health diagnosis device.

On the other hand, if the device information of the external device 700 is not saved in the memory 160, the controller 180 transmits a request signal for requesting the device information of the external device 700 to the external device 700 through the wireless communication unit 110 or the NFC module 185. The controller 180 receives the device information of the external device 700 from the external device 700 and then saves the received device information in the memory 160.

Figure 9:
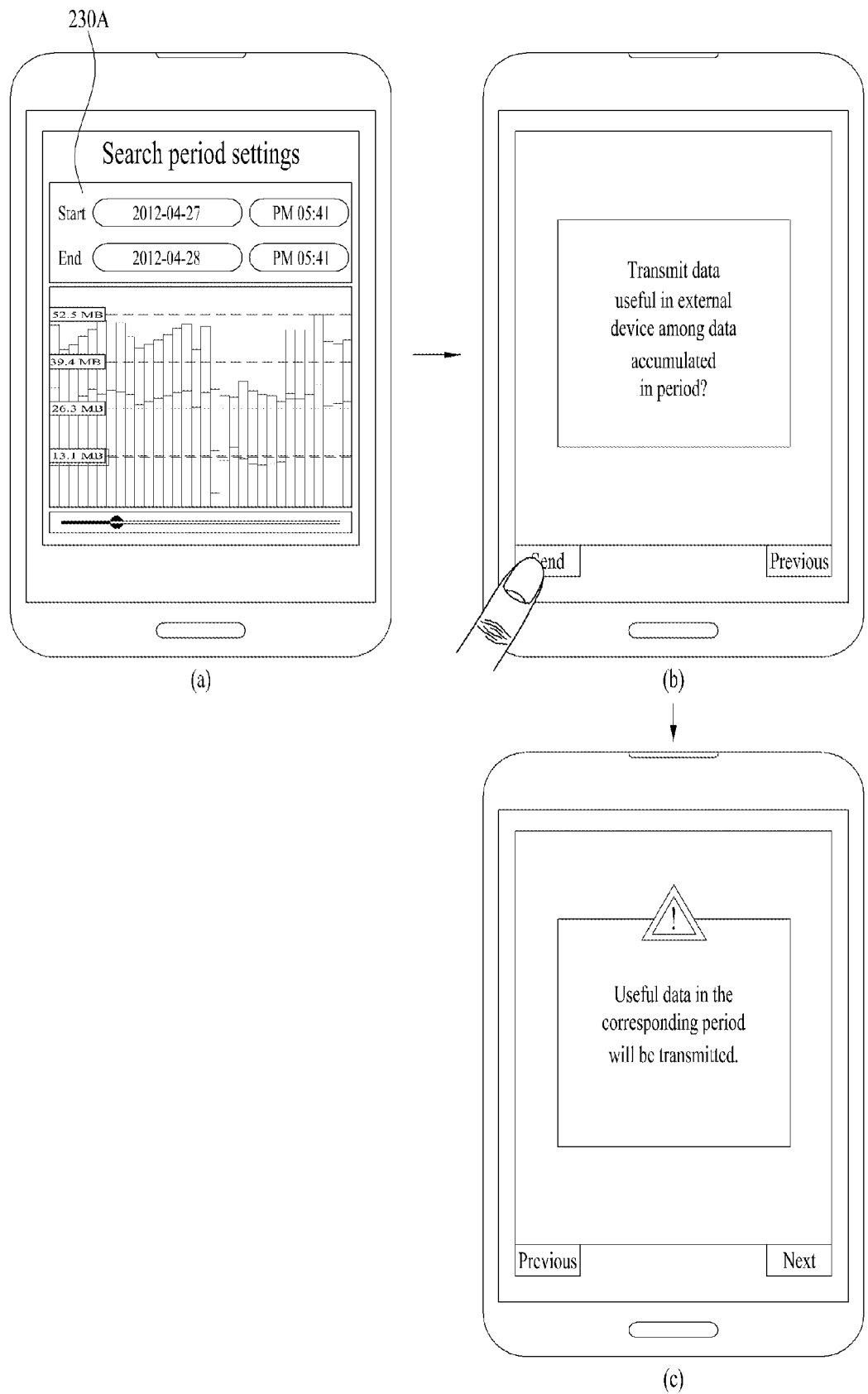
Figure 10:
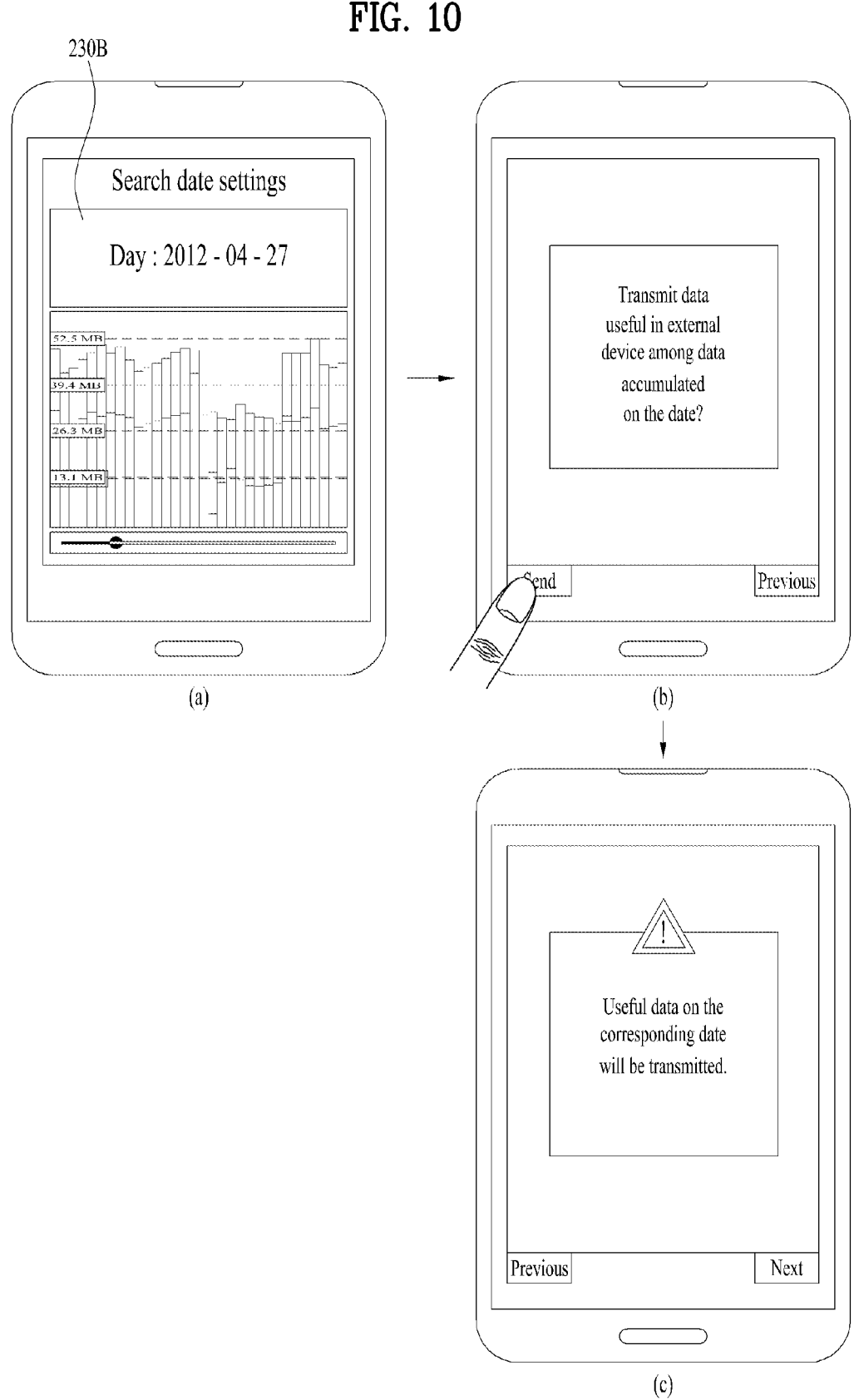

FIG. 9 shows a process for transmitting the data runnable or useful in the external device 700 among the data accumulated for a specific period to the external device 700. FIG. 10 shows a process for transmitting the data runnable or useful in the external device 700 among the data accumulated on a specific date to the external device 700.

Referring to FIG. 9 (a), the controller 180 displays a search period setting window 230A for setting a specific period between a data accumulation start date and a data accumulation end date on the screen. If the specific period between the data accumulation start date ("2012-04-27 PM 05:41") and the data accumulation end date ("2012-04-28 PM 05:41") is set through the search period setting window 230A, the controller 180 searches the data accumulated in the memory 160 for the data accumulated for the set period ("2012-04-27 PM 05:41"~"2012-04-28 PM 05:41"). Subsequently, based on the device information of the external device 700, the controller searches the found data for the data runnable or useful in the external device 700.

After the data runnable or useful in the external device 700 has been found, if a user's command for transmitting the found data is inputted [FIG. 9 (b)], the controller 180 transmits the found data to the external device 700 [FIG. 9 (c)].

Referring to FIG. 10 (a), the controller 180 displays a search date setting window 230B for setting a specific search date if data on the screen. If the specific date ("2012-04-27") previous to a present date is set through the search date setting window 230B, the controller 180 searches the data accumulated in the memory 160 for the data accumulated on the set date ("2012-04-27"). Subsequently, based on the device information of the external device 700, the controller searches the found data for the data runnable or useful in the external device 700.

After the data runnable or useful in the external device 700 has been found, if a user's command for transmitting the found data is inputted [FIG. 10 (b)], the controller 180 transmits the found data to the external device 700 [FIG. 10 (c)].

Figure 11:
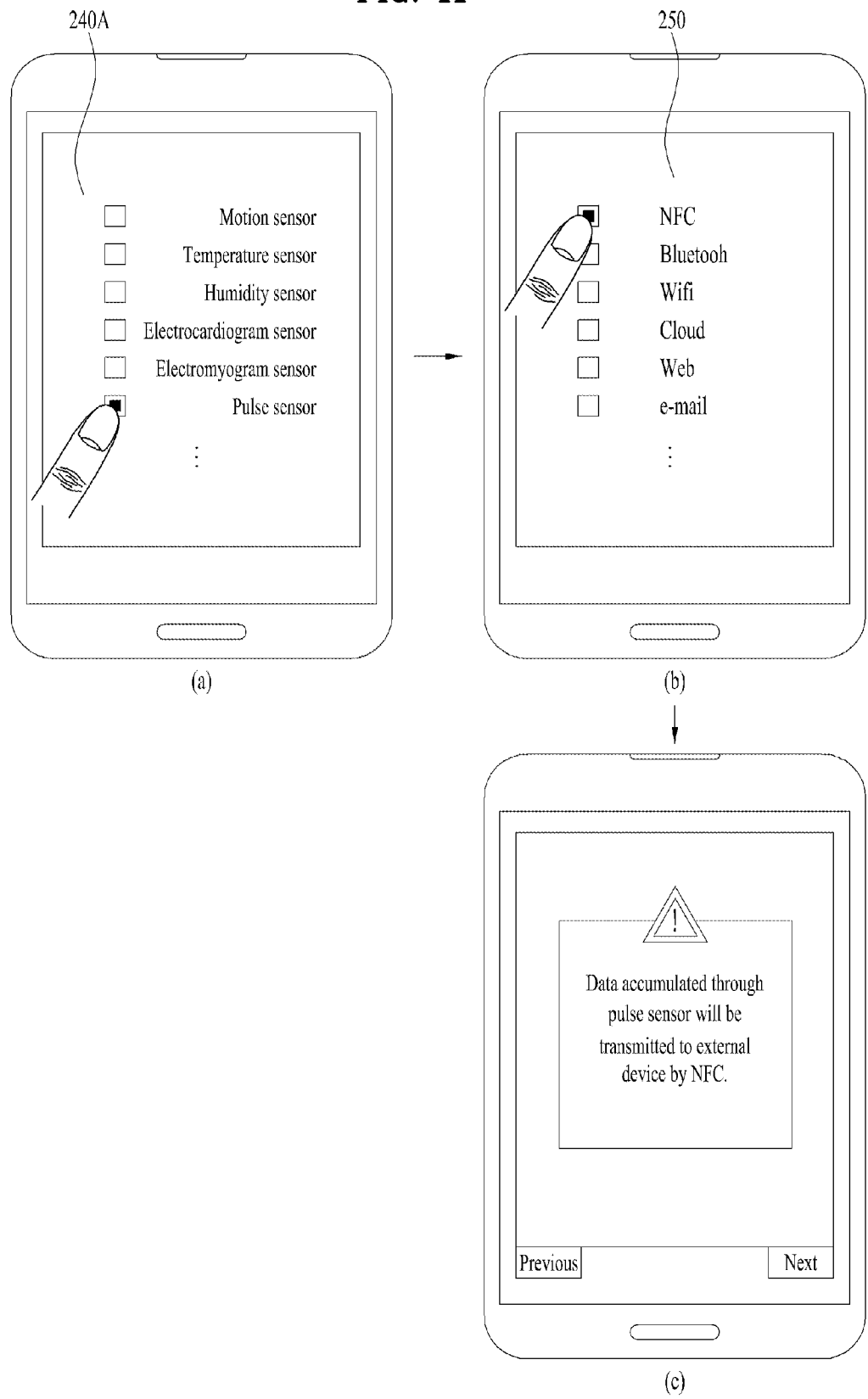

FIG. 11 shows a process for transmitting the data accumulated through the sensor selected by a user from the sensors provided to the mobile terminal 100 to the external device 700 by the communication system selected by the user.

For instance, referring to FIG. 11 (a), the controller 180 displays a list 240A of the sensors provided to the mobile terminal 100. If a specific sensor (e.g., pulse sensor) is selected from the list 240A, the controller 180 searches the data accumulated in the memory 160 for the data accumulated through the selected specific sensor.

Subsequently, referring to FIG. 11 (b), the controller 180 displays a list 250 of at least one communication system for transmitting the found data to the external device 700. If a specific communication system is selected from the list 250, referring to FIG. 11 (c), the controller 180 transmits the found data to the external device 700 by the selected communication system.

For another instance, based on the device information of the external device 700 saved in the memory 160, the controller 180 displays a list of the sensors provided to the external device 700. If a specific sensor is selected from the list, the controller 180 searches the data accumulated in the memory 160 for the data accumulated through the sensor, which is provided to the mobile terminal 100, identical to the selected specific sensor of the external device 700. Subsequently, if a specific communication system is selected from the list 250, the controller 180 transmits the found data to the external device 700 by the selected communication system.

For another instance, if a specific sensor is selected from the list 240A, the controller 180 obtains the external device 700 having the selected specific sensor from the at least one or more external devices capable of communications with the mobile terminal 100 based on the device information of the external device 700 provided to the memory 160 and is then able to transmit the data accumulated through the selected specific sensor to the obtained external device 700. In doing so, the controller 180 can transmit the data accumulated through the selected specific sensor to the external device 700 by the communication system selected from the list 250 by the user.

Figure 12:
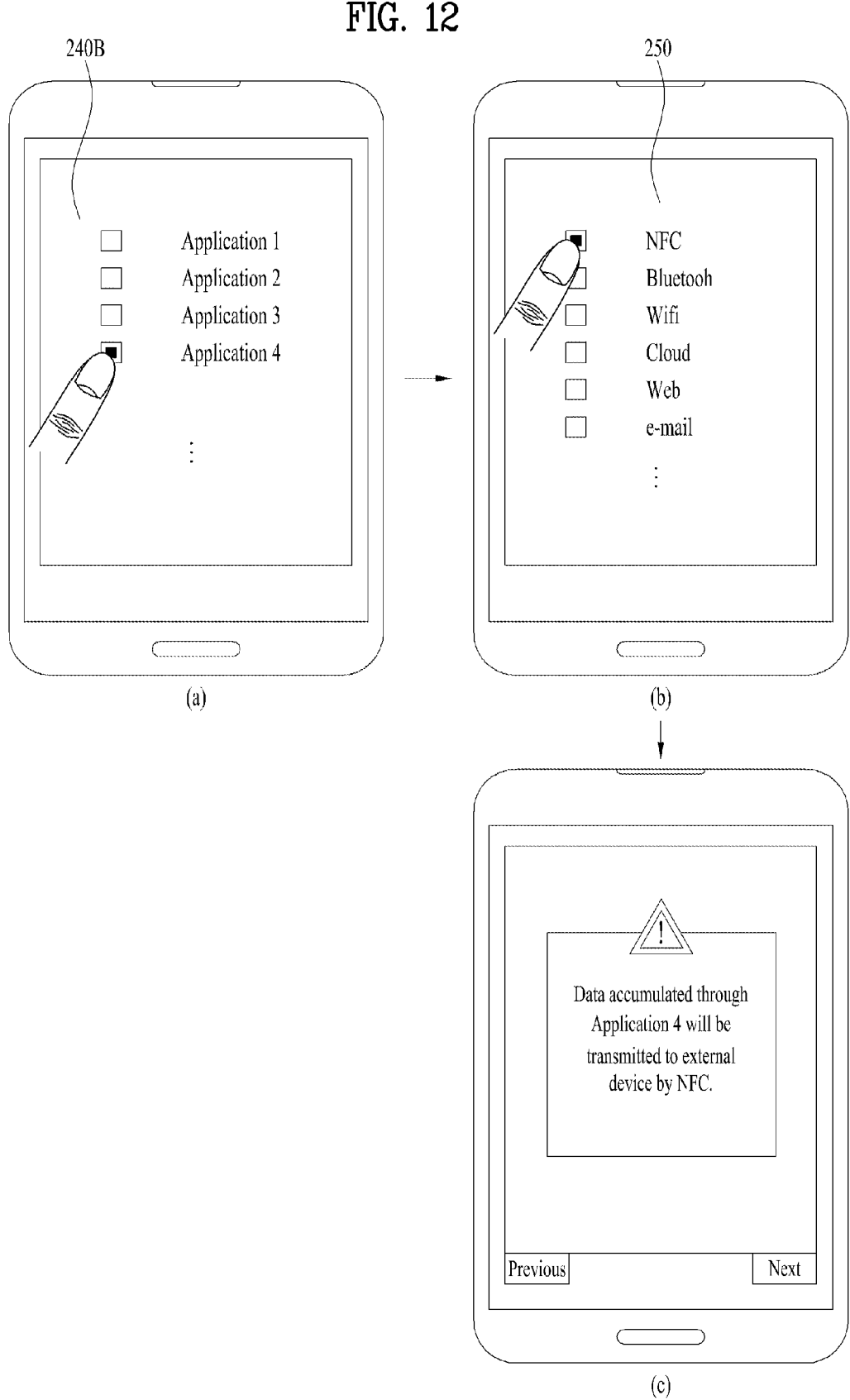

FIG. 12 shows a process for transmitting the data accumulated through the application selected by a user from the applications installed on the mobile terminal 100 to the external device 700 by the communication system selected by the user.

For instance, referring to FIG. 12 (a), the controller 180 displays a list 240B of the applications installed on the mobile terminal 100. If a specific application (e.g., Application 4) is selected from the list 240B, the controller 180 searches the data accumulated in the memory 160 for the data accumulated through the selected specific application.

Subsequently, referring to FIG. 12 (b), the controller 180 displays a list 250 of at least one communication system for transmitting the found data to the external device 700. If a specific communication system is selected from the list 250, referring to FIG. 12 (c), the controller 180 transmits the found data to the external device 700 by the selected communication system.

For another instance, based on the device information of the external device 700 saved in the memory 160, the controller 180 displays a list of the applications installed on the external device 700. If a specific application is selected from the list, the controller 180 searches the data accumulated in the memory 160 for the data accumulated through the application, which is installed on the mobile terminal 100, identical to the selected specific application of the external device 700. Subsequently, if a specific communication system is selected from the list 250, the controller 180 transmits the found data to the external device 700 by the selected communication system.

For another instance, if a specific application is selected from the list 240B, the controller 180 obtains the external device 700 having the selected specific application installed thereon from the at least one or more external devices capable of communications with the mobile terminal 100 based on the device information of the external device 700 provided to the memory 160 and is then able to transmit the data accumulated through the selected specific application to the obtained external device 700. In doing so, the controller 180 can transmit the data accumulated through the selected specific application to the external device 700 by the communication system selected from the list 250 by the user.

Figure 13:
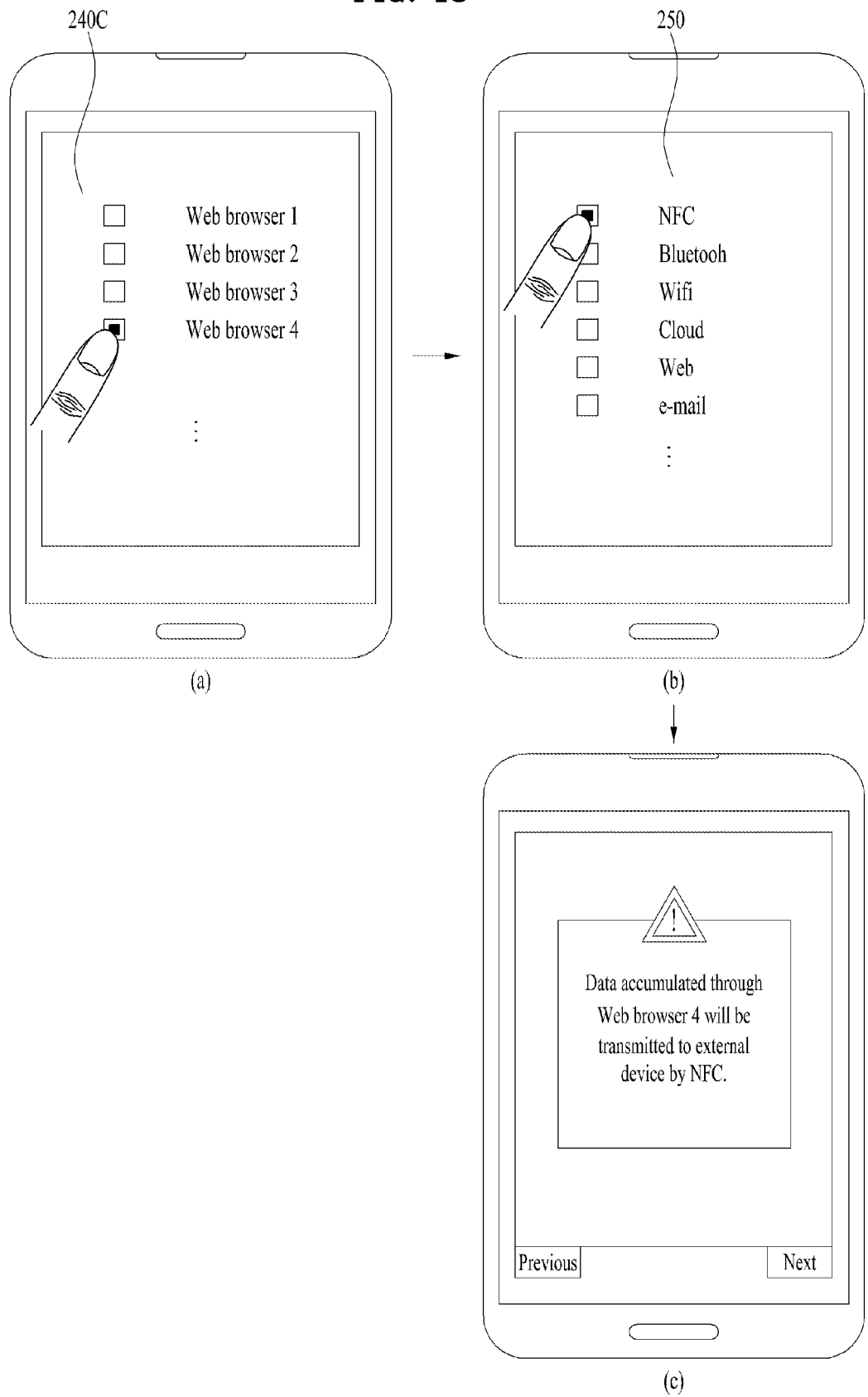

FIG. 13 shows a process for transmitting the data accumulated through the web browser selected by a user from the web browsers installed on the mobile terminal 100 to the external device 700 by the communication system selected by the user.

For instance, referring to FIG. 13 (a), the controller 180 displays a list 240C of the web browsers installed on the mobile terminal 100. If a specific web browser (e.g., Web browser 4) is selected from the list 240C, the controller 180 searches the data accumulated in the memory 160 for the data accumulated through the selected specific web browser.

Subsequently, referring to FIG. 13 (b), the controller 180 displays a list 250 of at least one communication system for transmitting the found data to the external device 700. If a specific communication system is selected from the list 250, referring to FIG. 13 (c), the controller 180 transmits the found data to the external device 700 by the selected communication system.

For another instance, based on the device information of the external device 700 saved in the memory 160, the controller 180 displays a list of the web browsers installed on the external device 700. If a specific web browser is selected from the list, the controller 180 searches the data accumulated in the memory 160 for the data accumulated through the web browser, which is installed on the mobile terminal 100, identical to the selected specific web browser of the external device 700. Subsequently, if a specific communication system is selected from the list 250, the controller 180 transmits the found data to the external device 700 by the selected communication system.

For another instance, if a specific web browser is selected from the list 240C, the controller 180 obtains the external device 700 having the selected specific web browser installed thereon from the at least one or more external devices capable of communications with the mobile terminal 100 based on the device information of the external device 700 provided to the memory 160 and is then able to transmit the data accumulated through the selected specific web browser to the obtained external device 700. In doing so, the controller 180 can transmit the data accumulated through the selected specific application to the external device 700 by the communication system selected from the list 250 by the user.

Figure 14:
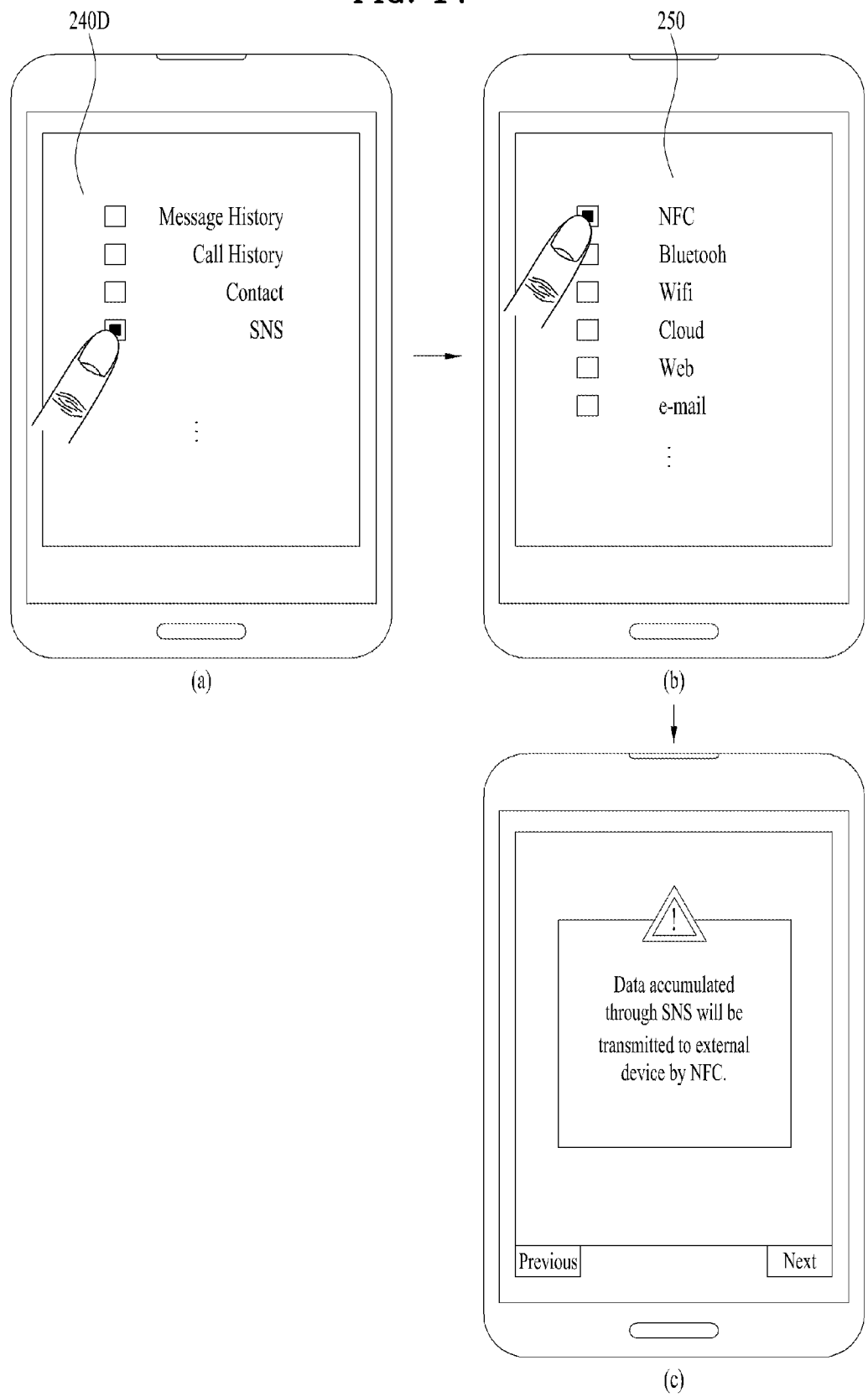

FIG. 14 shows a process for transmitting the data accumulated through the menu/function selected by a user from the menus/functions provided to the mobile terminal 100 to the external device 700 by the communication system selected by the user.

For instance, referring to FIG. 14 (a), the controller 180 displays a list 240D of the menus and/or functions provided to the mobile terminal 100. If a specific function (e.g., SNS) is selected from the list 240D, the controller 180 searches the data accumulated in the memory 160 for the data accumulated through the SNS.

Subsequently, referring to FIG. 14 (b), the controller 180 displays a list 250 of at least one communication system for transmitting the found data to the external device 700. If a specific communication system is selected from the list 250, referring to FIG. 14 (c), the controller 180 transmits the found data to the external device 700 by the selected communication system.

For another instance, based on the device information of the external device 700 saved in the memory 160, the controller 180 displays a list of the menus and/or functions provided to the external device 700. If a specific function (e.g., SNS) is selected from the list, the controller 180 searches the data accumulated in the memory 160 for the data accumulated through the SNS, which is installed on the mobile terminal 100, identical to the selected SNS of the external device 700. Subsequently, if a specific communication system is selected from the list 250, the controller 180 transmits the found data to the external device 700 by the selected communication system.

For another instance, if a specific menu or function (e.g., SNS) is selected from the list 240D, the controller 180 obtains the external device 700 having the selected SNS installed thereon from the at least one or more external devices capable of communications with the mobile terminal 100 based on the device information of the external device 700 provided to the memory 160 and is then able to transmit the data accumulated through the selected specific SNS to the obtained external device 700. In doing so, the controller 180 can transmit the data accumulated through the selected specific sensor to the external device 700 by the communication system selected from the list 250 by the user.

Figure 15:
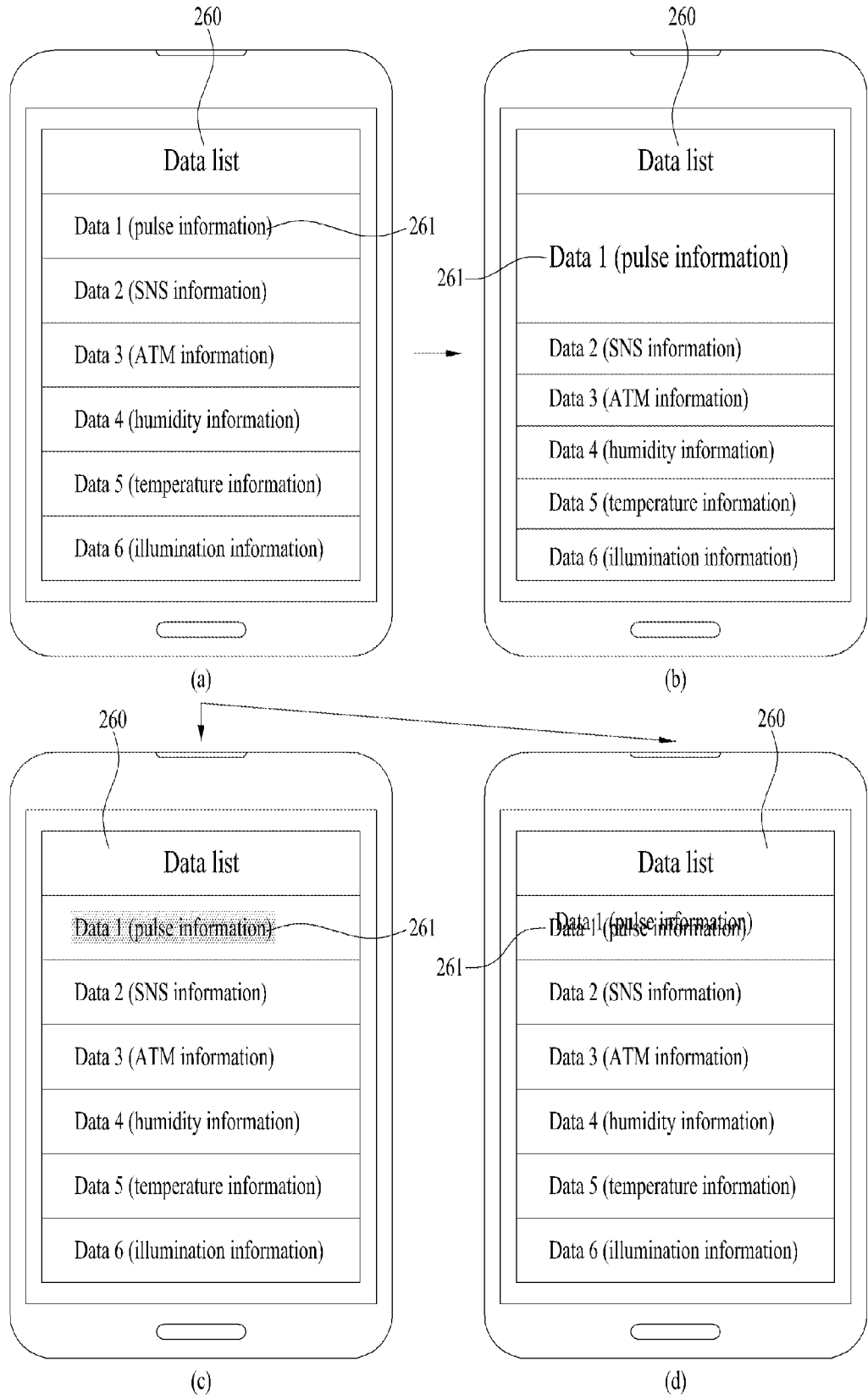

FIG. 15 shows a process for the controller 180 to display a list of data accumulated in the memory 160 and to control data useful in the external device 700 to be identifiably displayed on the list.

FIG. 15 (a) shows that a list 260 of the data accumulated in the memory 160 is displayed on the screen.

In doing so, based on the device information of the external device 700 provided to the memory 160, the controller 180 obtains data runnable or useful in the external device 700 from the data in the list 260. Subsequently, referring to FIGS. 15 (b) to 15 (d), the controller 180 can control the obtained data to be displayed on the list 260 in a manner of being identifiable from other data.

In particular, the controller 180 control a display style of the obtained data to be different from that of other data in the list 260, thereby enabling the obtained data to be identifiably displayed.

For instance, referring to FIG. 15 (*b*), the controller 180 controls the obtained data to be enlarged greater than other data in the list 260, thereby enabling the obtained data to be identifiably displayed. For another instance, referring to FIG. 15 (*c*), the controller 180 controls a display color of the obtained data to differ from other data in the list 260, thereby enabling the obtained data to be identifiably displayed. For another instance, referring to FIG. 15 (*d*), the controller 180 controls the obtained data to be displayed on the list 260 in a manner of being transformed 3-dimensionally, thereby enabling the obtained data to be identifiably displayed.

FIG. 16 shows a process for the controller 180, if at least two data runnable or useful in the external device are found, to create a data file by integrating the found at least two data into one and to transmit the created data file to the external device 700.

For instance, referring to FIG. 16 (*a*), if at least two runnable or useful in the external device 700 are found by the process described with reference to FIG. 3, the controller 180 displays a query window for querying whether to integrate the found data. If the integration of the found data is determined through the query window, referring to FIG. 16 (*b*), the controller 180 creates a data file by integrating the found data into one and then transmits the created data file to the external device 700.

FIG. 17 shows a process for the controller 180, if a data runnable or useful in the external device 700 is found, to display a list of the found data and the transmit the data selected from the list by a user to the external device 700.

For instance, referring to FIG. 17 (*a*), if at least two runnable or useful in the external device 700 are found by the process described with reference to FIG. 3, the controller 180 displays a list 270 of the found data on the screen. If at least one data 271 is selected from the list 270, referring to FIG. 17 (*b*), the controller 180 transmits the data 271 selected from the list 270 to the external device 700.

FIG. 18 shows a process for the controller 180 to display a list of data accumulated in the memory 160 on the screen and, if the data selected from the list by a user is not runnable or useful in the external device 700, to recommend the data runnable or useful in the external device 700 in the list to the user.

For instance, referring to FIG. 18 (*a*), while a list 280 of the data accumulated in the memory 160 is displayed on the screen, if a user selects at least one data 281, which is to be transmitted to the external device 700, from the list 280, the controller 180 checks whether the selected data 281 is runnable or executable in the external device 700 based on the device information of the external device 700 saved in the memory 160.

If the selected data 281 is not runnable or useful in the external device 700, the controller 180 displays an information, which indicates that the selected data 281 is not runnable or useful in the external device 700, on the list 280 and then searches the data included in the list 280 for the data runnable or useful in the external device 700 based on the device information of the external device 700.

Subsequently, referring to FIG. 18 (*b*), the controller 180 controls the found data 282 to be displayed as a popup window on the screen or controls the found data 282 to be identifiably displayed within the list 280.

When the controller 180 transmits a runnable or useful data to the external device 700, if a history that the runnable or useful data was previously transmitted to the external device 700 exists in the memory 160, FIG. 19 shows a process for the controller 180 to transmit a data, which is equal to or associated with the previously transmitted data, among the data currently runnable to useful in the external device 700 to the external device 700 based on the history.

For instance, referring to FIG. 19 (*a*), the controller 180 saves a previous transmission history of the data previously transmitted to the external device 700 in the memory 160. If data runnable or useful in the external device 700 is found by the process described with reference to FIG. 3, referring to FIG. 19 (*b*), the controller 180 searches the found data for a data equal to or associated with the previously transmitted data based on the previous transmission history and then transmits the found data to the external device 700.

Finally, FIG. 20 shows a process for the controller 180, if data runnable or useful in the external device 700 is found by the process described with reference to FIG. 3, to control the found data to be transmitted to the external device 700 in a manner of being encrypted for the personal information protection of the found data.

For instance, referring to FIG. 20 (*a*), if data runnable or useful in the external device 700 is found from data accumulated in the memory 160 by the process described with reference to FIG. 3, the controller 180 displays a password setting window 290 for the encryption setting of the found data.

If a password for the encryption of the found data is set up through the password setting window 290, referring to FIG. 20 (*b*), the controller 180 encrypts the found data with the set password and then transmits the encrypted data to the external device 700.

In particular, the encrypted data transmitted to the external device 700 is runnable or useful only if the password set up in the mobile terminal is inputted through the external device 700.

Accordingly, a mobile terminal and controlling method thereof according to the present invention provide various effects and/or features.

First of all, data useful in an external device is selected from data accumulated in the mobile terminal and then transmitted only, whereby the external device can utilize the whole data received from the mobile terminal.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a display unit;
    a wireless communication unit configured to communicate with an external device and to receive specific data from a specific external device, wherein the specific data includes a measured value by at least one sensor of the specific external device;
    a memory configured to store a plurality of data, wherein the plurality of data includes data accumulated at the mobile terminal and the received specific data, and to store device information of the external device, wherein the stored device information includes at least one of device specification of components of the external device, a list of applications provided at the external device and a list of types of data runnable in the external device; and
    a controller configured to:
        search the plurality of data to identify, based on the stored device information, at least one data runnable or useful in the external device; and
        control the wireless communication unit to transmit the identified data to the external device.

2. The mobile terminal of claim 1, wherein in response to a setting of a specific period between a data accumulation start date and a data accumulation end date, the controller to search the plurality of data for data accumulated during the set specific period and then to search the accumulated data for at least one data runnable or useful in the external device.

3. The mobile terminal of claim 1, wherein when a specific date previous to a present date is set, the controller to search the plurality of data for data accumulated on the set date and then to search the accumulated data for at least one data runnable or useful in the external device.

4. The mobile terminal of claim 1, further comprising:
    at least one sensor, and
    wherein the plurality of data includes data accumulated by the at least one sensor of the mobile terminal.

5. The mobile terminal of claim 4, wherein the controller to recognize the external device and to transmit the data accumulated by the at least one sensor to the recognized external device.

6. The mobile terminal of claim 1, wherein the memory to be provided with at least one application, and wherein the plurality of data includes data accumulated via the at least one application.

7. The mobile terminal of claim 6, wherein the controller to recognize the external device and to transmit the data accumulated by the at least one application to the recognized external device.

8. The mobile terminal of claim 1, wherein the plurality of data includes data accumulated via a specific web browser or a specific menu function.

9. The mobile terminal of claim 1, wherein the plurality of data includes data accumulated via a specific social network service (SNS) function.

10. The mobile terminal of claim 9, wherein the controller to recognize the external device and to transmit the data accumulated via the SNS function to the recognized external device.

11. The mobile terminal of claim 1, wherein the controller to control the display unit to display a list of the plurality of data, and wherein the controller to control at least one data runnable or useful in the external device to be identifiably displayed within the list.

12. The mobile terminal of claim 1, wherein the memory to store history information of data previously transmitted to the external device, and wherein the controller to transmit data associated with the previously transmitted data from among the searched data to the external device based on the history information.

13. The mobile terminal of claim 1, wherein the controller to encrypt the searched data and to transmit the encrypted data to the external device.

14. The mobile terminal of claim 1, wherein the mobile terminal includes a first near field communication (NFC) module and the external device includes a second NFC module, and wherein when the first NFC module is tagged with the second NFC module, the controller to transmit the searched data to the external device.

15. The mobile terminal of claim 1, wherein when a plurality of data is searched, the controller to create a data file by integrating the searched data into one and to control the wireless communication unit to transmit the created data file to the external device.

16. The mobile terminal of claim 1, wherein when at least one data to be transmitted to the external device is selected from the plurality of data and the selected data is not useful in the external device, the controller to control the display unit to display at least one data runnable or useful in the external device among the plurality of data.

17. A method of controlling a mobile terminal, the method comprising:
    receiving specific data from a specific external device, wherein the specific data includes a measured value by at least one sensor of the specific external device;
    storing, in a memory, a plurality of data, wherein the plurality of data includes data accumulated at the mobile terminal and the received specific data;
    storing, in the memory, device information of an external device, wherein the stored device information includes at least one of device specification of components of the external device, a list of applications provided at the external device and a list of types of data runnable in the external device;
    searching the plurality of data to identify, based on the stored device information, at least one data runnable or useful in the external device; and
    transmitting the identified data to the external device.

18. The method of claim 17, further comprising:
    displaying a list of the plurality of data; and
    displaying at least one data runnable or useful in the external device to be identifiably displayed within the list.

19. The method of claim 17, further comprising:
when at least one data to be transmitted to the external device is selected from the plurality of data and the selected data is not runnable or useful in the external device, displaying at least one data runnable or useful in the external device among the plurality of data.

20. A mobile terminal, comprising:
a display;
a wireless communication unit to wirelessly communicate with an external device and to receive specific data from a specific external device, wherein the specific data includes a measured value by at least one sensor of the specific external device; and
a controller configured to:
   determine, based on the data accumulated at the mobile terminal, the received specific data and specific device information of the external device, data runnable or useful in the external device, wherein the specific device information includes at least one of device specification of components of the external device, a list of applications provided at the external device and a list of types of data runnable in the external device, and
   transmit the determined data to the external device.

* * * * *